US008002624B2

(12) United States Patent
Paulsen et al.

(10) Patent No.: US 8,002,624 B2
(45) Date of Patent: Aug. 23, 2011

(54) GAMING MACHINE REEL HAVING A FLEXIBLE DYNAMIC DISPLAY

(75) Inventors: Craig Paulsen, Reno, NV (US); Chan Griswold, Reno, NV (US); Joseph R. Hedrick, Reno, NV (US); Richard Wilder, Sparks, NV (US); Harold Mattice, Gardenerville, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/964,962

(22) Filed: Sep. 27, 2001

(65) Prior Publication Data

US 2003/0060269 A1 Mar. 27, 2003

(51) Int. Cl.
*A63F 9/24* (2006.01)
*A63F 13/00* (2006.01)
*G06F 17/00* (2006.01)
*G06F 19/00* (2006.01)

(52) U.S. Cl. ................ 463/20; 463/31; 463/40; 463/42; 273/143 R; 273/138 A; 273/138.2

(58) Field of Classification Search .............. 463/20–22, 463/30–31, 16, 34, 39, 40, 42; 40/446–452
See application file for complete search history.

(56) References Cited

U.S. PATENT DOCUMENTS 1,488,889 A 4/1924 Lollis
3,864,024 A * 2/1975 Olson .......................... 359/272
4,127,849 A 11/1978 Okor
4,448,419 A 5/1984 Telnaes ......................... 273/143
4,614,342 A 9/1986 Takashima
4,711,452 A 12/1987 Dickinson et al. ............ 273/143
4,838,552 A * 6/1989 Hagiwara ........................ 463/20
4,856,787 A * 8/1989 Itkis .............................. 273/237
4,932,147 A * 6/1990 David ............................. 40/448
5,026,152 A 6/1991 Sharkey
5,135,224 A * 8/1992 Yamamoto et al. ............ 463/20
5,239,227 A 8/1993 Kikinis
5,342,047 A 8/1994 Heidel et al.
5,413,357 A 5/1995 Schulze et al.
5,524,888 A * 6/1996 Heidel ............................ 463/22
5,580,055 A 12/1996 Hagiwara
5,634,080 A 5/1997 Kikinis et al.
(Continued)

FOREIGN PATENT DOCUMENTS

EP 0 134 979 A2 3/1985
(Continued)

OTHER PUBLICATIONS

AV Video: Announce World's First Video-Capable Flexible Plastic LCD Display: Jun. 2001, http://www.avvideo.com/2001/06_jun/news/plastic_video.htm.*

(Continued)

*Primary Examiner* — Paul A. D'Agostino
(74) *Attorney, Agent, or Firm* — Weaver Austin Villeneuve & Sampson LLP

(57) ABSTRACT

A gaming machine, specifically a slot machine, having a viewing region through which one or more internal reels are visible. The internal reels having a flexible display, mounted on the outer circumferential region of the reel, capable of displaying an infinite number of different indicia to a player of the machine. By allowing an infinite number of indicia to be displayed, the gaming machine may be programmed with a variety of gaming options and payouts.

35 Claims, 5 Drawing Sheets

U.S. PATENT DOCUMENTS

| | | | | |
|---|---|---|---|---|
| 5,680,160 | A | 10/1997 | LaPointe | |
| 5,688,551 | A | 11/1997 | Littman et al. | |
| 5,752,881 | A * | 5/1998 | Inoue | 463/20 |
| 5,770,533 | A | 6/1998 | Franchi | |
| 5,770,914 | A | 6/1998 | Pease et al. | 310/339 |
| 5,788,573 | A | 8/1998 | Baerlocher et al. | 463/16 |
| 5,803,453 | A | 9/1998 | Stephan et al. | 273/138.2 |
| 5,807,172 | A | 9/1998 | Piechowiak | |
| 5,816,918 | A | 10/1998 | Kelly et al. | |
| 5,839,957 | A * | 11/1998 | Schneider et al. | 463/20 |
| 5,839,960 | A | 11/1998 | Parra et al. | |
| 5,911,419 | A | 6/1999 | Delaney et al. | |
| 5,924,926 | A | 7/1999 | Brown | |
| 5,929,474 | A | 7/1999 | Huang et al. | |
| 5,947,820 | A | 9/1999 | Morro et al. | 463/9 |
| 5,951,397 | A | 9/1999 | Dickinson | 463/36 |
| 5,965,907 | A | 10/1999 | Huang et al. | |
| 5,971,271 | A | 10/1999 | Wynn et al. | |
| 5,977,704 | A | 11/1999 | Shi et al. | |
| 6,002,206 | A | 12/1999 | Harrison et al. | |
| 6,008,784 | A * | 12/1999 | Acres et al. | 345/82 |
| 6,016,176 | A | 1/2000 | Kim et al. | 349/84 |
| 6,027,115 | A | 2/2000 | Griswold et al. | 273/143 |
| 6,033,307 | A | 3/2000 | Vancura | |
| 6,068,552 | A | 5/2000 | Walker et al. | |
| 6,075,316 | A | 6/2000 | Shi et al. | |
| 6,082,887 | A | 7/2000 | Feuer et al. | |
| 6,135,884 | A | 10/2000 | Hedrick et al. | |
| 6,155,925 | A | 12/2000 | Giobbi et al. | |
| 6,162,121 | A | 12/2000 | Morro et al. | |
| 6,166,496 | A | 12/2000 | Lys et al. | |
| 6,205,690 | B1 | 3/2001 | Heropoulos et al. | |
| 6,229,505 | B1 | 5/2001 | Fujii | |
| 6,251,014 | B1 | 6/2001 | Stockdale et al. | |
| 6,254,481 | B1 | 7/2001 | Jaffe et al. | |
| 6,264,561 | B1 | 7/2001 | Saffari et al. | |
| 6,287,202 | B1 | 9/2001 | Pascal et al. | |
| 6,315,666 | B1 | 11/2001 | Mastera et al. | |
| 6,366,016 | B1 | 4/2002 | Sakaguchi et al. | |
| 6,406,371 | B1 | 6/2002 | Baba et al. | |
| 6,454,649 | B1 | 9/2002 | Mattice et al. | |
| 6,464,581 | B1 * | 10/2002 | Yoseloff et al. | 463/20 |
| 6,485,884 | B2 | 11/2002 | Wolk et al. | |
| 6,502,758 | B2 * | 1/2003 | Cottrell | 236/46 R |
| 6,503,147 | B1 | 1/2003 | Stockdale et al. | |
| 6,517,433 | B2 * | 2/2003 | Loose et al. | 463/20 |
| 6,609,968 | B1 | 8/2003 | Okada et al. | |
| 6,638,165 | B2 | 10/2003 | Uchiyama et al. | |
| 6,659,866 | B2 | 12/2003 | Frost et al. | |
| 6,722,987 | B2 | 4/2004 | Orr et al. | |
| 6,743,094 | B2 | 6/2004 | Johnson | |
| 6,743,102 | B1 * | 6/2004 | Fiechter et al. | 463/42 |
| 6,773,345 | B2 | 8/2004 | Walker et al. | |
| 6,798,148 | B2 | 9/2004 | Inukai | |
| 6,893,345 | B2 | 5/2005 | Motegi et al. | |
| 6,908,387 | B2 | 6/2005 | Hedrick et al. | |
| 6,911,781 | B2 | 6/2005 | Yamazaki et al. | |
| 6,923,720 | B2 | 8/2005 | Loose | |
| 6,939,226 | B1 * | 9/2005 | Joshi | 463/20 |
| 7,008,324 | B1 | 3/2006 | Johnson et al. | |
| 7,048,629 | B2 | 5/2006 | Sines et al. | |
| 7,053,890 | B2 | 5/2006 | Inukai | |
| 7,169,048 | B2 | 1/2007 | Nozaki et al. | |
| 7,204,753 | B2 * | 4/2007 | Ozaki et al. | 463/16 |
| 7,335,101 | B1 | 2/2008 | Luciano, Jr. | |
| 7,542,198 | B2 | 6/2009 | Kothari | |
| 7,682,249 | B2 | 3/2010 | Winans et al. | |
| 7,811,170 | B2 | 10/2010 | Winans et al. | |
| 2002/0012898 | A1 | 1/2002 | Shechter et al. | |
| 2002/0082083 | A1 | 6/2002 | Ito et al. | |
| 2002/0142846 | A1 * | 10/2002 | Paulsen | 463/43 |
| 2002/0173354 | A1 | 11/2002 | Winans et al. | |
| 2002/0187831 | A1 | 12/2002 | Arikawa et al. | |
| 2003/0032479 | A1 | 2/2003 | LeMay et al. | |
| 2003/0045343 | A1 | 3/2003 | Luccesi et al. | |
| 2003/0060269 | A1 | 3/2003 | Paulsen et al. | |
| 2003/0064784 | A1 | 4/2003 | Wells et al. | |
| 2003/0195045 | A1 | 10/2003 | Kaminkow et al. | |
| 2003/0220134 | A1 | 11/2003 | Walker et al. | |
| 2003/0232651 | A1 | 12/2003 | Huard et al. | |
| 2004/0082385 | A1 | 4/2004 | Silva et al. | |
| 2004/0142745 | A1 | 7/2004 | Hosaka | |
| 2004/0219978 | A1 | 11/2004 | Teramoto et al. | |
| 2005/0054440 | A1 | 3/2005 | Anderson et al. | |
| 2005/0153776 | A1 | 7/2005 | LeMay et al. | |
| 2005/0272505 | A1 | 12/2005 | Okamura | |
| 2006/0014580 | A1 | 1/2006 | Hawthorn | |
| 2006/0100013 | A1 | 5/2006 | Enzminger | |
| 2007/0004510 | A1 | 1/2007 | Underdahl et al. | |
| 2007/0052660 | A1 | 3/2007 | Montbach et al. | |
| 2007/0054730 | A1 | 3/2007 | Mattice et al. | |
| 2007/0093290 | A1 | 4/2007 | Winans et al. | |
| 2007/0293299 | A1 | 12/2007 | Aida | |
| 2008/0020827 | A1 | 1/2008 | Underdahl et al. | |
| 2008/0096624 | A1 | 4/2008 | Rydberg | |
| 2008/0200233 | A1 | 8/2008 | Aida | |
| 2009/0104969 | A1 | 4/2009 | Paulsen et al. | |

FOREIGN PATENT DOCUMENTS

| | | | |
|---|---|---|---|
| EP | 0 246 021 | A2 | 11/1987 |
| EP | 0 896 308 | A1 | 2/1999 |
| EP | 1 082 980 | A2 | 3/2001 |
| EP | 1 291 829 | | 3/2003 |
| EP | 1 422 673 | A | 5/2004 |
| EP | 1 550 987 | | 7/2005 |
| GB | 2092795 | | 8/1982 |
| GB | 2116345 | | 9/1983 |
| GB | 2253299 | | 9/1992 |
| GB | 2447481 | | 9/2008 |
| JP | 2002-360908 | | 12/2002 |
| JP | 2004-081826 | | 3/2004 |
| JP | 2004-089689 | | 3/2004 |
| WO | WO 98/03962 | | 1/1998 |
| WO | WO 98/50804 | | 11/1998 |
| WO | WO 00/55879 | | 9/2000 |
| WO | WO 00/60669 | | 10/2000 |
| WO | WO 02/091319 | | 11/2002 |
| WO | WO 2005/071628 | | 8/2005 |
| WO | WO 2005/114600 | | 12/2005 |
| WO | WO 2008/030781 | | 3/2008 |
| WO | WO 2008/057929 | | 5/2008 |
| WO | WO 2010/042328 | | 4/2010 |

OTHER PUBLICATIONS

"The Tube," Businessweek Online: http://www.businessweek.com:/2000/00_10/design3.htm?scriptFramed, pp. 1-2, dated Mar. 6, 2001, printed Dec. 20, 2001.

Lieberman, David, "Push is on to Replace Glass with Plastic in LCDs," EETimes.com: http://www/eetimes.com/story/OEG19990615S0031, pp. 1-4, dated Jun. 15, 1998, printed Sep. 6, 2000.

"Foled Flexible Organic Light Emitting Device," Universal Display Corporation Online: http://www.universaldisplay.com/foled.php, pp. 1-2, printed Apr. 26, 2001.

U.S. Appl. No. 12/247,844, filed Oct. 8, 2008, Paulsen et al.

US Office Action dated Jul. 12 , 2007 issued in U.S. Appl. No. 10/756,225.

US Final Office Action dated Jan. 8, 2008 issued in U.S. Appl. No. 10/756,225.

US Office Action dated Jun. 26, 2008 issued in U.S. Appl. No. 10/756,225.

US Final Office Action dated Feb. 2, 2009 issued in U.S. Appl. No. 10/756,225.

US Advisory Action dated Apr. 21, 2009 issued in U.S. Appl. No. 10/756,225.

US Office Action dated Jul. 7, 2009 issued in U.S. Appl. No. 10/756,225.

US Office Action dated Jun. 25, 2010 issued in U.S. Appl. No. 11/592,614.

US Office Action dated Jun. 23, 2009 issued in U.S. Appl. No. 11/517,861.

US Examiner Interview Summary dated Sep. 18, 2009 issued in U.S. Appl. No. 11/517,861.

US Office Action dated Mar. 15, 2010 issued in U.S. Appl. No. 11/517,861.
US Office Action dated Jun. 25, 2009 issued in U.S. Appl. No. 11/880,937.
US Examiner Interview Summary dated Sep. 18, 2009 issued in U.S. Appl. No. 11/880,937.
US Office Action Final dated Jan. 21, 2010 issued in U.S. Appl. No. 11/880,937.
US Office Action dated Mar. 30, 2009 issued in U.S. Appl. No. 09/047,889.
US Notice of Allowance dated Sep. 22, 1999 issued in U.S. Appl. No. 09/047,889.
US Office Action dated Oct. 5, 2005 issued in U.S. Appl. No. 10/139,801.
US Office Action Final dated Mar. 16, 2006 issued in U.S. Appl. No. 10/139,801.
US Office Action dated Jul. 6, 2006 issued in U.S. Appl. No. 10/139,801.
US Office Action Final dated Jan. 5, 2007 issued in U.S. Appl. No. 10/139,801.
US Advisory Action dated Apr. 4, 2007 issued in U.S. Appl. No. 10/139,801.
US Examiner Interview Summary dated Apr. 26, 2007 issued in U.S. Appl. No. 10/139,801.
US Office Action dated Jun. 4, 2007 issued in U.S. Appl. No. 10/139,801.
US Office Action Final dated Feb. 21, 2008 issued in U.S. Appl. No. 10/139,801.
US Office Action dated Aug. 20, 2008 issued in U.S. Appl. No. 10/139,801.
US Office Action dated Jan. 30, 2009 issued in U.S. Appl. No. 10/139,801.
US Examiner Interview Summary dated Aug. 13, 2009 issued in U.S. Appl. No. 10/139,801.
US Notice of Allowance dated Sep. 14, 2009 issued in U.S. Appl. No. 10/139,801.
US Notice of Allowance dated Dec. 2, 2009 issued in U.S. Appl. No. 10/139,801.
US Office Action dated Oct. 31, 2008 issued in U.S. Appl. No. 11/546,659.
US Office Action dated May 12, 2009 issued in U.S. Appl. No. 11/546,659.
US Examiner Interview Summary dated Aug. 12, 2009 issued in U.S. Appl. No. 11/546,659.
US Notice of Allowance dated Apr. 20, 2010 issued in U.S. Appl. No. 11/546,659.
International Search Report dated Jun. 6, 2005 issued in PCT/US2005/000387.
Written Opinion dated Jun. 6, 2005 issued in PCT/US2005/000387.
International Preliminary Report on Patentability dated Jul. 27, 2006 issued in PCT/U52005/000387.
AU Examiner's First Report dated Nov. 13, 2009 issued in 2005207295.
Chinese First Office Action dated Nov. 28, 2008 issued in 200580002282.8.
Chinese Second Office Action dated Mar. 1, 2010 issued in 200580002282.8.
European Office Action dated Apr. 24, 2009 issued in 05 705 161.7-1238.
Mexican Office Action dated May 12, 2009 issued in U.S. Appl. No. 06/07949.
Russian Office Action dated Dec. 15, 2006 issued in 2006124191/09 (026231).
Russian Office Action dated Dec. 8, 2008 issued in 2006124191/09 (026231).
PCT International Search Report dated Apr. 16, 2008 issued in PCT/US2007/083315.
PCT International Preliminary Report on Patentability and Written Opinion dated Apr. 16, 2008 issued in PCT/US2007/083315.
European Examination Report dated Oct. 30, 2009 issued in 07 863 774.1-2221.
European Examination Report dated Jun. 4, 2010 issued in 07 863 774.1-2221.
PCT International Search Report dated Apr. 9, 2008 issued in PCT/US2007/077453.
PCT International Preliminary Report on Patentability and Written Opinion dated Mar. 10, 2009 issued in PCT/US2007/077453.
PCT International Search Report and Written Opinion dated Jan. 21, 2010 issued in PCT/US2009/058261.
PCT International Search Report dated Aug. 14, 2003 issued in PCT/US02/13863.
PCT Written Opinion dated Sep. 24, 2003 issued in PCT/US02/13863.
PCT International Preliminary Examination Report dated Nov. 24, 2003 issued in PCT/US02/13863.
Patent Abstracts of Japan vol. 2000, No. 09, Oct. 13, 2000 & JP 2000 172444 A (Semiconductor Energy Lab Co LTD), Jun. 23, 2000 abstract.
Patent Abstracts of Japan vol. 2000, No. 20, Jul. 10, 2001 & JP 2001 076886 A (Futaba Corp), Mar. 23, 2001 abstract.
Australian Examiner's First Report dated Feb. 16, 2007 issued in AU 2002256429.
Australian Examiner's First Report dated Jan. 15, 2009 issued in AU 2007216701.
EP Examination Report dated Dec. 9, 2005 issued in EP 02 725 894.6-2218.
EP Examination Report dated Jan. 12, 2007 issued in EP 02 725 894.6-2218.
EP Examiner's Report dated Jul. 20, 2009 issued in EP 02 725 894.6-2218.
Del Conte, Natali T. (Aug. 29, 2006) "Philips Demos Digital Game Board"[online] [retrieval date unknown] Retrieved from: http://www.pcmag.com/article2/0,1895,2009874,00.asp, 2 pp.
Display of "High Rollers Triple Diamond" Gaming Machine at a casino in Nevada in about 1995 (photograph of similar machine) 2 pp.
"First Generation Electronic Paper Display From Philips, Sony and E Ink to be Used in New Electronic Reading Device", (Mar. 24, 2004) [online] [retrieved on Sep. 8, 2005] Retrieved from: URL:http://www.eink.com/news/releases/pr70.html, 2 pp, XP002344236.
Kavoossi B, (Dec. 12, 2001) "Printed Micro Systems on Paper", [online] [retrieved on Sep. 9, 2005] Retrieved from: URL:http://www.tekes.fi/julkaisut/Active_imaging.pdf, pp. 1-106, XP-002344235.
Planar Operations Manual (prior to Jan. 1997) "Electroluminescent Display" Planar America, Inc., 1400 NW Campton Drive, Beaverton, Oregon 97006, 3 pp.
IBM, *Organic Light Emitting Diodes Project*, downloaded from internet Apr. 16, 2002, http://www.almaden.ibm.com/st/projects/oleds/ 4 pages.
Kodak, *What It Is*, downloaded from internet Apr. 25, 2002 http://www.kodak.com/US/en/corp/display/overview.jhtml 9 pages.
Rolltronics, By Dr. James Sheats, *Introduction to Organic Light-Emitting Diodes* (*OLEDs*), downloaded from internet Apr. 16, 2002, http://www.rolltronics.com/introoled.htp 9 pages.
Schröder, Tim (Feb. 28, 2005) "Microelectronics Display Panels with Electronic Ink", Fraunhofer Magazin, Fraunhofer Gesellschaft, Muenchen, DE, 2:38-39, XP-002344237, pp. 38-39.
Universal Display Corporation, "From Passive to Active Matrix", downloaded from internet Apr. 25, 2002, http://www.universaldisplay.com/matrix.php 2 pages.
Universal Display Corporation, *FOLED Flexible Organic Light Emitting Device*, downloaded from internet Apr. 25, 2002, http://www.universaldisplay.com/foled.php 2 pages.
US Office Action Final dated Nov. 1, 2010 issued in U.S. Appl. No. 11/592,614.
US Notice of Allowance dated Aug. 26, 2010 issued in U.S. Appl. No. 11/546,659.
AU Notice of Acceptance dated Aug. 25, 2010 issued in 2005207295.
Chinese Third Office Action dated Feb. 16, 2011 issued in 200580002282.8.

* cited by examiner

GAMING MACHINE REEL HAVING A FLEXIBLE DYNAMIC DISPLAY

BACKGROUND OF THE INVENTION

The present invention relates to gaming apparatus commonly known as slot machines, and more particularly to a flexible dynamic display panel provided on the reels of slot machines to produce various indicia.

Conventional slot machines are gaming devices which incorporate a plurality of reels, typically three, rotatable about a common axis. Each reel has multiple indicia printed on the periphery depicting specific symbols relevant to game play. A player initiates a play on a slot machine by, for example, pulling a lever or depressing a triggering button. Upon initiating a play, a random number generator generates a first number, which in turn corresponds to an indicium or symbol. The first reel is then stopped to display the selected indicium. In a similar fashion, the second and third reels display indicium corresponding to second and third numbers generated by the random number generator. After the reels have stopped spinning, the microprocessor evaluates the outcome of the first, second, and third generated random numbers to determine if there is a winning combination. When a play concludes with a winning combination being displayed, a payout may be awarded to a player.

In a traditional, three reel, mechanical slot machine, each reel might have, for example, twenty-two stops or indicia which can be displayed as part of a multiple reel payline combination. The probability for paying off on a specific combination of indicia is dependent upon the number of reels in play, the number of symbols on each reel, and the number of winning symbol combinations. For instance, the lowest probability, one in which there is only one winning combination, can be mathematically represented as $1:N^R$ where N is the number of indicia on each reel and R is the number of reels. Therefore, for a traditional, three reel, mechanical slot machine having twenty-two symbols, the lowest probability that can be obtained is $1:22^3$ or 1:10,648. Thus, for the slot machine to be commercially viable, the maximum jackpot payable by such slot machine is limited to the amount that could be paid one in every ten thousand six hundred forty eight plays.

As today's slot machine players become more sophisticated, the market demands higher payouts and greater game variation to maintain and increase player appeal. To allow for higher purses, and still remain commercially viable, a traditional slot machine can either increase the number of symbols per reel, or alternatively add reels to the machine. Both alternatives, however, have proven undesirable effects. For example, it is difficult to provide more than about twenty-five symbols per reel as the reel then becomes too large to fit within the physical dimensions of the standard-sized slot machine. Similarly, it has been observed that slot machines having more than three reels are less appealing to slot machine players.

One alternative technique for increasing the jackpot size in slot games employs a "virtual reel," described in U.S. Pat. No. 4,448,419 to Telnaes. In general, a "virtual reel" is a software program which allows a slot machine to increase the payout without increasing the number of reels or the number of symbols per reel. The virtual reel software program contains instructions which map a number of virtual symbols to physical symbols on the slot machine reel. For example, a virtual reel may contain forty-four possible virtual symbols with each virtual symbol corresponding to one specific physical symbol on a twenty-two symbol reel. Therefore, in this example, the virtual reel effectively raises the lowest probability that can be obtained to 1:443 or 1:85,184, which greatly increases the available largest payout.

During a typical virtual reel slot machine play, a slot player initiates spinning of the slot machine reels through any number of means, including pulling a handle. The "virtual reel" software program then randomly selects a symbol from the virtual reel, all while the physical reel is spinning and observable by the player through a display glass. A control circuit then causes the spinning reel to stop at the symbol selected by the software. Therefore, the software controls the actual outcome of the game and the physical reel merely acts as a display device.

Another alternative technique for increasing the jackpot size in slot games employs a slot machine reel with luminescent display elements. This technique is detailed in U.S. Pat. No. 6,027,115 to Griswold et al. In general, slot machines utilizing the luminescent display element technique contain reels in which "symbol regions" contain electroluminescent elements. Multiple electroluminescent elements may be arranged in each symbol region to allow a given symbol to be displayed in multiple formats, with each format representing an independent indicia for payout purposes. For example, a "7" symbol could be displayed with its outline illuminated, with interior cross hatching, with a combination of cross hatching and outline illuminated, or with different colors. Thus, each possible symbol may appear to a player to be different physical symbol, despite the fact it exists within the same physical symbol region. By utilizing this technique, or by combining this technique with a virtual reel, the designer has still greater flexibility in creating higher odds and offering a much larger payout.

One drawback to either a virtual reel or a reel containing an electroluminescent display is that the slot machine game play is still limited by the number of unique symbols that can be displayed by the physical reel. In other words, in utilizing a traditional physical reel with twenty-two symbols, a virtual reel can display, at most, twenty-two unique symbols. Similarly, while an electroluminescent reel may increase the number of unique symbols possible, the electroluminescent reel is also limited by the number of unique luminescent patterns. Still further, if the owner of the slot machine utilizing either technique wishes to change the gaming symbols, the slot machine reels must be physically replaced, resulting in extremely costly "down-time" for the machine and consequently lost revenue for the owner.

To allow a gaming machine with an infinite number of display symbols, game manufacturer's have utilized flat, rigid panel displays, (i.e., liquid crystal displays ("LCDs"), or light emitting diode ("LED") displays) similar to a display of a computer screen. By utilizing a rigid display panel, a computer processor is able to create, display, manipulate and control a "virtual slot machine" without any mechanical spinning reels, further allowing for an infinite number of possible symbol displays and increased payouts. However, while the use of the virtual slot machine has proven popular in today's personal computer market, it has not met with much success in casinos, as a slot machine player desires the visual stimulation, and excitement of a traditional, spinning reel slot machine.

SUMMARY OF THE INVENTION

The invention is directed to a slot machine that may comprise a slot machine reel rotatable about an axis, a flexible display panel, capable of dynamically displaying game play indicia, mounted on the slot machine reel, liquid crystal driver circuitry, and a controller operatively coupled to the flexible display. The controller may have a microprocessor and a memory and may be programmed to display indicia relevant to game play on the flexible display.

The features and advantages of the present invention will be apparent to those of ordinary skill in the art in view of the detailed description of various embodiments, which is made with reference to the drawings, a brief description of which is provided below.

DESCRIPTION OF THE VARIOUS EMBODIMENTS

Figure 1:
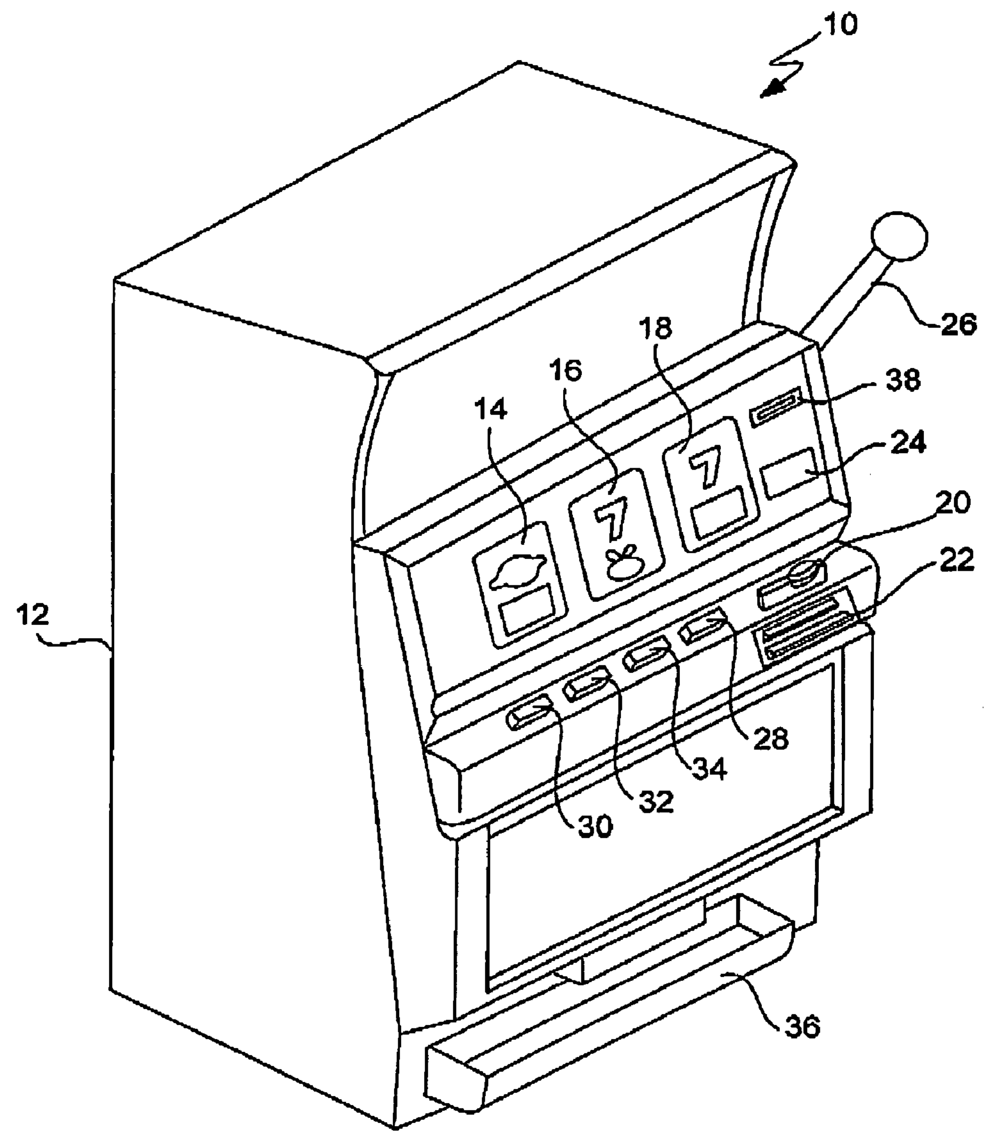
FIG. 1 is a perspective view of a slot machine having flexible display panel reels in accordance with one embodiment of the present invention.

Turning now to FIG. 1 there is illustrated a slot machine 10 for use with the present invention. Slot machine 10 may include an exterior housing 12, a plurality of flexible display reels, which may be designated as a first flexible display reel 14, a second flexible display reel 16 and a third flexible display reel 18. Slot machine 10 may further include a first slot or opening 20 for accepting tokens, coins or any other suitable elements that may or may not be representative of monetary value, a second slot or opening 22 for accepting various denominations of paper currency, and a credit display 24 for displaying game information such as currency insertion. The slot machine 10 may also include a handle or arm 26 and a spin button 28 (either of which may be referred to as a spin actuator), a number of buttons 30, 32 and 34 that a user may actuate to make bets or wagers, and a payout tray or hopper 36. The slot machine 10 may further include a player tracking slot 38 for accepting various devices that hold information relative to player tracking, such as a debit card, a smartcard, or the like, including cards that include a monetary value.

Figure 2:
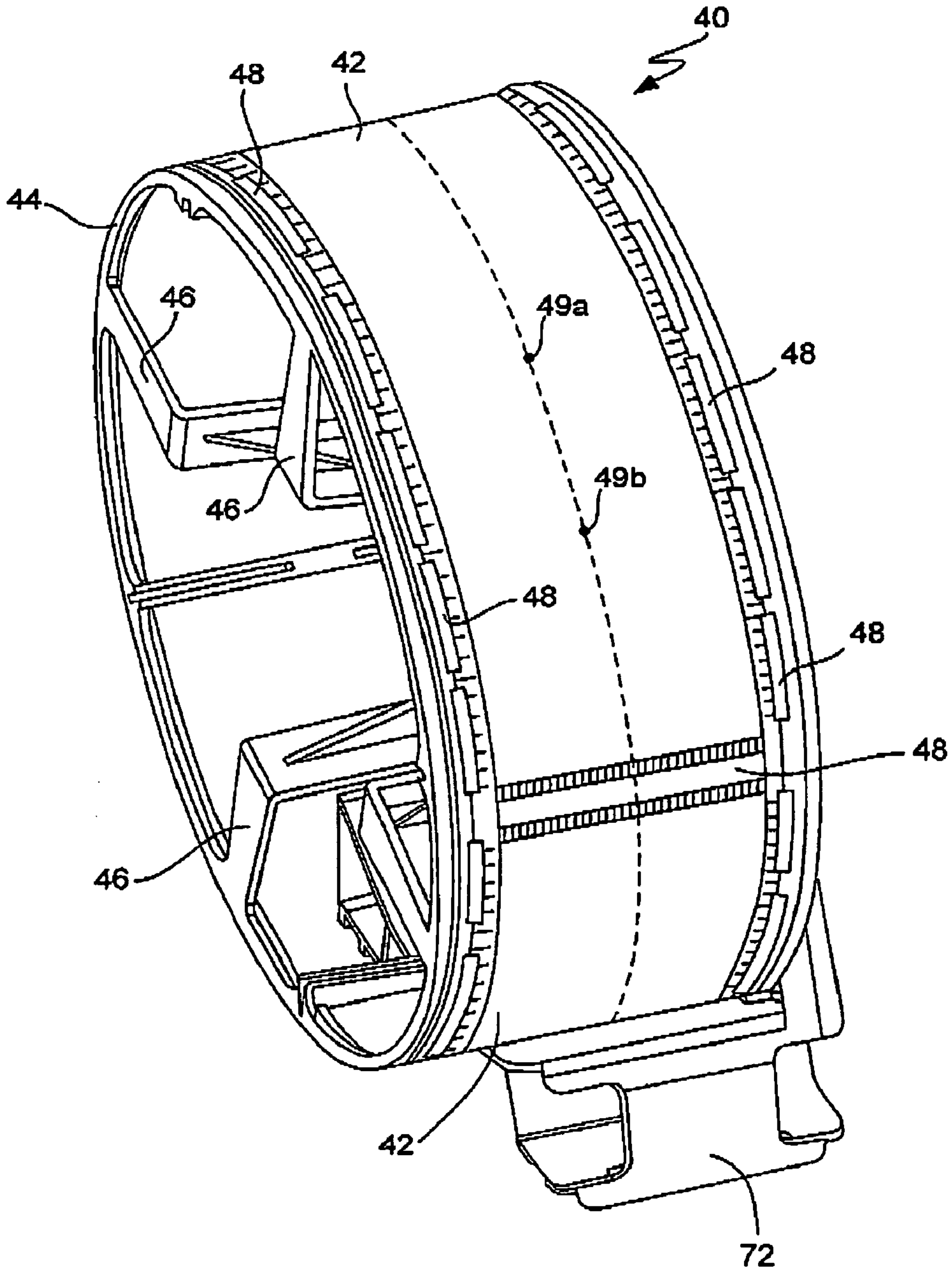
FIG. 2 is an illustration of a slot machine reel having a flexible display panel in accordance with one embodiment of the present invention.

Turning to FIG. 2, there is depicted a slot machine reel 40 in accordance with one embodiment of the present invention. As illustrated, the reel 40 may include a flexible display panel 42 mounted to an outer circumference 44 of an internal or supporting portion 46 of reel 40. The flexible display panel 42 may be a LCD panel, or a LED display panel capable of being shaped to mount to the outer circumference 44 of reel 40. The flexible display panel 42 may be further capable of displaying an infinite number of possible indicia relevant to game play. The flexible display panel 42 may be a panel having at least one flexible portion which allows the flexible display panel to be bent, without sharp angles, and yet still maintain the display quality associated with well known, non-flexible LCD or LED display panels. One example of a flexible display panel 42 is a LCD panel described in U.S. Pat. No. 6,016,176 to Kim et al. Another example of a flexible display panel 42 is a Flexible Organic Light Emitting Device ("FOLED") developed by Universal Display Corporation, Ewing, N.J. The slot machine reel 40 may further include one or more integrated circuits 48 which process appropriate data to control display of the various indicia.

While the slot machine reel 40 of FIG. 2 is depicted with one flexible display panel 42 mounted to the outer circumference 44, it will be understood by those of ordinary skill in the art that multiple flexible display panels may be mounted to the outer circumference, for instance, two, three, or four, etc., flexible display panels 42 may be mounted to the outer circumference 44. Recognizing that known non-flexible display panels may have some "flexibility," i.e., they may be bent a small amount, it will be understood that the term "flexible display panel," as used herein means that the flexible display panel 42 is capable of being bent, turned or forced from a substantially straight line or form without breaking and without compromising the display quality associated with well known, non-flexible LCD or LED display panels, to contact the outer circumference of the slot machine reel 40. For example, if two points 49*a* and 49*b* are placed on the outer circumference 44 of the slot machine reel 40 and separated by an angular displacement of at least about ten degrees along the circumference, the flexible display 42 would be capable of bending or flexing to contact the two points without breaking and without compromising the display quality associated with well known, non-flexible display panels. In another example, if four flexible display panels 42 are consecutively mounted on the outer circumference 44 of the slot machine reel 40 and the two points 49*a* and 49*b* are separated by an angular displacement of about ninety degrees, a first end of one of the flexible display panels 44 would contact the point 49*a* and a second end would contact the point 49*b*.

Figure 3:
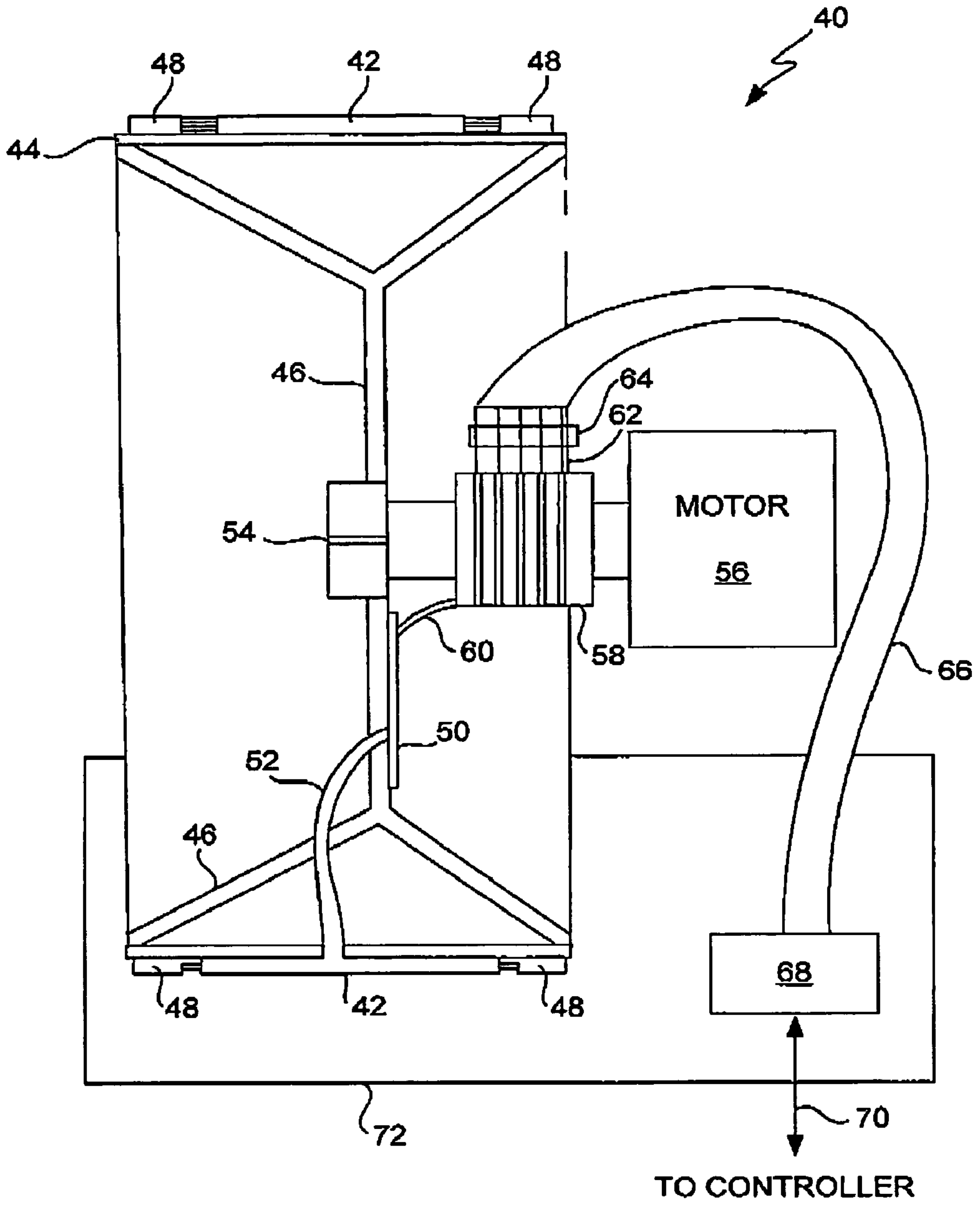
FIG. 3 is a front cross-sectional view of a flexible display panel reel together with a drive motor and electrical connection to an external control circuit in accordance with one embodiment of the present invention.

FIG. 3 presents a cross sectional view of the slot machine reel 40 in accordance with one embodiment of this invention. Specifically, FIG. 3 shows a cross section through the axis of rotation and perpendicular to the reel's radius. As shown in the cross section, the slot machine reel 40 may include the flexible display panel 42 mounted to the outer circumference 44 of the internal or supporting portion 46 of the reel 10. An display driver 50 may be mounted to the interior of supporting portion 46 of the reel 40. The display driver 50 may control at least a portion of the displayed indicia in the flexible display panel 42. The display driver 50 and flexible display panel 42 may be electrically connected through one or more lines 52.

The supporting portion 46 of the reel 40 may rotate about an axis of rotation 54, the rotation being controlled by a drive motor 56. The drive motor 56 may be a stepper motor such as an ASTROSYN Miniangle Stepper type motor bearing model number 34PM-C007-14, which is available from Minebea Co. LTD. Alternatively, as will be appreciated by those having ordinary skill in the art, other types of motors may be used. Slip ring drum 58 may be attached to axis of rotation 54 and may further be electrically connected to the display driver 50 via electrical lines 60. During rotation of the reel by drive motor 56, slip ring drum 58, electrical lines 60, and display driver 50 may all rotate together about the axis of rotation 54.

An electrical control signal, which provide instructions to the display driver 50, may be provided from outside the rotating reel via brushes 62 mounted to brush block 64. The control signal to the brush block 64 may, in turn, be provided by a cable 66 which may mount to a connector 68. At least one line 70 from the connector 68 may be provided to a controller, described below, which controls the game's displayed indicia and the game outcome. The entire reel mechanism may be mounted on a stand 72.

Figure 4:
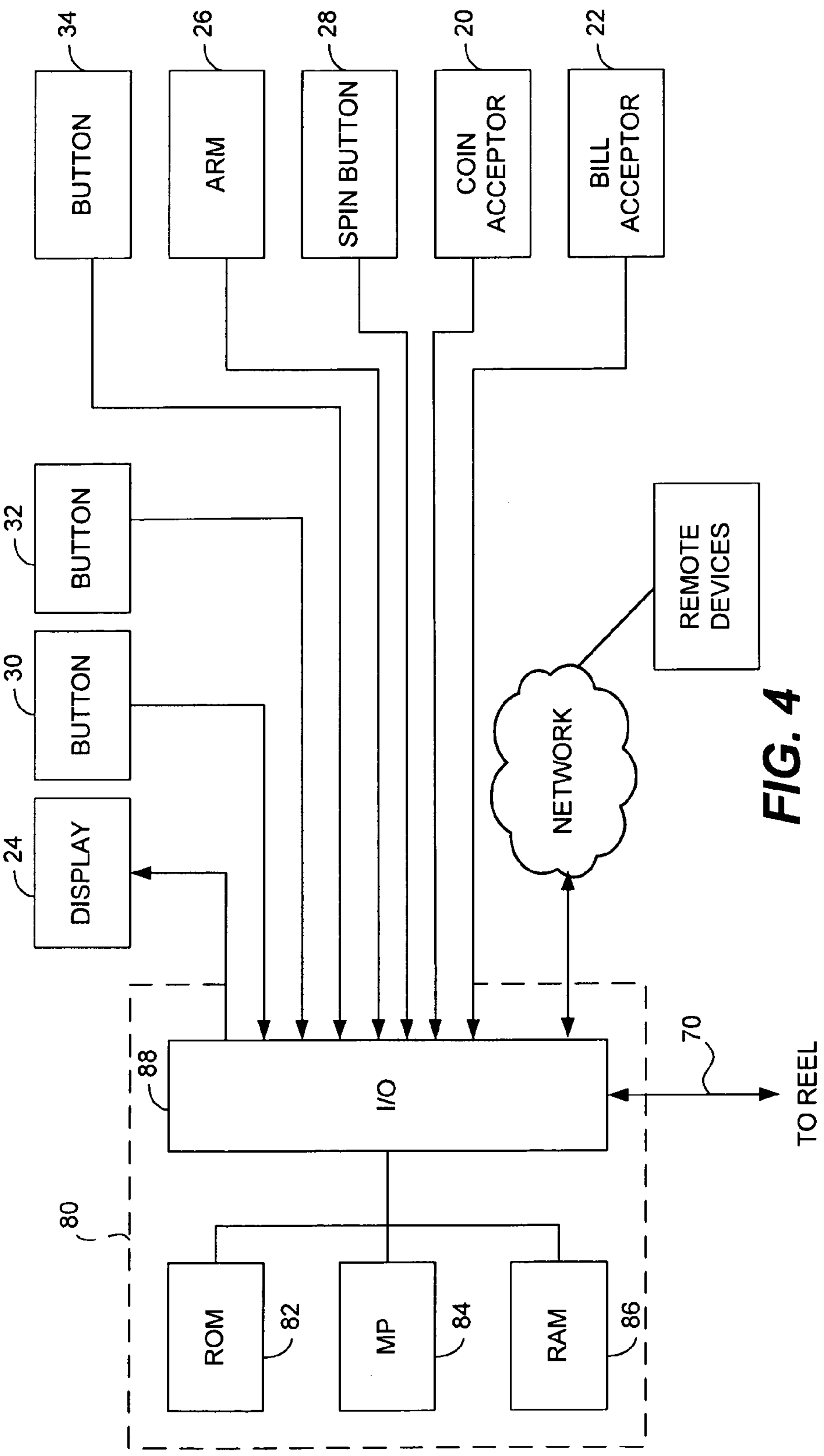
FIG. 4 is a block diagram of the electronic control circuit components in accordance with one embodiment of the present invention.

FIG. 4 is a block diagram of a number of components that may be incorporated into the present invention. Referring to FIG. 4, a controller 80 may comprise a read-only memory (ROM) 82, a microcontroller or microprocessor (MP) 84, a random-access memory (RAM) 86 and an input/output circuit (I/O) 88 all of which may be interconnected connected via an address/data bus 90. The line 70 from the controller 80 may be provided to the connector 68. It should be appreciated that although only one microprocessor 84 is shown, the controller 80 could include multiple microprocessors 84. Similarly, the memory of the controller 80 could include multiple RAMs 86 and multiple ROMs 82. The RAM(s) 86 and ROM (s) 82 could be implemented as semiconductor memories, magnetically readable memories, and/or optically readable memories, for example. Furthermore, although the I/O circuit 88 is shown as a single block, it should be appreciated that the I/O circuit 88 could include a number of different types of I/O circuits, including an I/O circuit with the ability to receive local network, wide area network, Internet and/or Intranet addressable information. Moreover the I/O circuit 88 may be adapted to receive a number of signals which may allow a programmer to change the information stored within the RAM(s) 86 and/or ROM(s) 82 and therefore vary the game play described below.

FIG. 4 also illustrates that the components described above could be connected to the I/O circuit 88 via a respective direct line or conductor. Different connection schemes could be used. For example, one or more of the components shown in FIG. 4 could be connected to the I/O circuit 88 via a common bus or other data link that is shared by a number of components. Furthermore, some of the components could be directly connected to the microprocessor 84 without passing through the I/O circuit 88.

Figure 5:
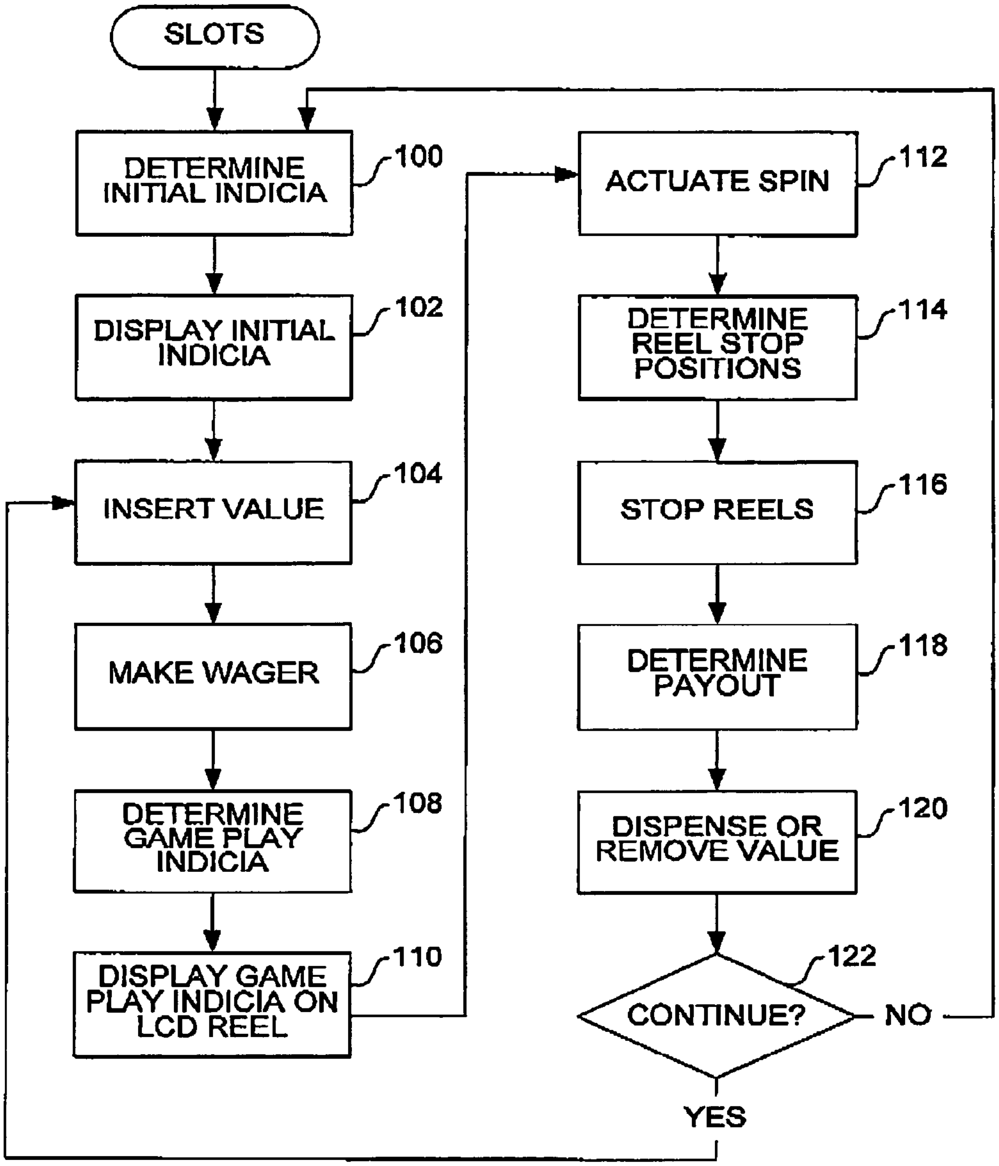
FIG. 5 is a flowchart of a gaming routine that may be performed by the electronic control circuit components of FIG. 4.

A typical use of the slot machine 10 containing the flexible display panel 42 is set forth in the flow diagram illustrated in FIG. 5. At a block 100, the controller 80 may determine the initial indicia to display on reels 14, 16, 18. For example, the controller 80 may be programmed to choose indicia designed to attract a player to the slot machine 10, such as gaming instructions, or simulations of game play. The controller 80 may instruct the display driver 50 to display the chosen indicia at a block 102. Once attracted to the slot machine 10, a user may begin game play by inserting into the slot machine 10 value that the user may bet at a block 104. For example, a user may deposit tokens or coins via the slot 20, may insert a monetary bill into the bill acceptor 22, or may insert an appropriate item into the player tracking slot 38. The following description refers to value being inserted into and dispensed from the slot machine 10. As used herein the term "value" is intended to encompass conventional tokens, coin or bill currency, debit card, smartcard or any other suitable objects that may be representative of some monetary value. Furthermore, as used herein the term value may include cards having value associated therewith (e.g., printed cards, smart cards or the like).

Once the controller 80 recognizes that the user has deposited value, the user may make a wager using the buttons 30, 32, 34 at a block 106. By using the buttons 30, 32, 34 the user may wager various units of value on the outcome of the game. The controller 80 may then determine the game play indicia for each reel 14, 16, 18 at a block 108. It will be recognized by those skilled in the art that the controller 80 may be programmed to determine an infinite variety of game play indicia and furthermore, the criteria for determining the indicia may be based upon any criteria. For example, game play indicia may be themed to a particular casino, gaming machine, gaming area, and/or game show, and the indicia may be further chosen based upon the amount of value inserted by the user. Furthermore, the controller 80 may be programmed to dynamically change the chosen indicia before, during or after game play to offer the user a unique game play experience. Once the game play indicia is determined, at a block 110, the controller 80 may instruct the display driver 50 to display the game play indicia on the flexible display panel 42 associated with each of the reels 14, 16, 18. The user may then begin a game play, at a block 112, either by pulling the arm 26 or by depressing the spin button 28, either of which causes the slot machine 10 to spin the reels 14, 16, 18 for a period of time.

At a block 114, the controller 80 may determine the outcome of the game and determine the reel stop positions. The controller 80 may then stop the reels 14, 16, 18 from spinning according to the determined outcome of the game at a block 116. As the reels 14, 16, 18 are stopped, indicia representative of the game outcome may be displayed to the user on the flexible display panel 42 of each of the associated reels 14, 16, 18. At a block 118, the controller 80 may examine the indicia displayed to the user and determines the payout afforded the user based upon gaming instructions stored within the controller 80. For example, the gaming machine may be programmed to pay a scheduled amount if three sevens are displayed to the user. At a block 120, the slot machine 10 may either dispense or remove value based upon the analysis of the block 118. For example, a "winning" combination of indicia pays out by dispensing value to the user, while a "losing" combination removes the value wagered by the user. The concept of dispensing value may include dropping tokens into the payout tray 36, accumulating value for the user within the slot machine 10 or any other suitable technique of distributing value to a user. Regardless of the outcome, at a block 122, the user is presented with the option of continuing game play, in which case the process returns to the block 104, or ending game play, in which case the game play returns to the block 100 to attract another player.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A gaming apparatus comprising:

a housing;

a value-input device configured to receive a medium of value;

an input device configured to receive a wager;

a display driver;

a controller;

a reel rotatable about an axis; and a motor capable of rotating said reel about said axis, and operatively coupled to the controller;

said reel comprising a support mechanism having an outer circumference; and at least one flexible display panel capable of being shaped to mount to said outer circumference, said at least one flexible display panel mounted to said outer circumference, and comprising at least one of a liquid crystal display or light emitting diode display configured to display indicia;

wherein:

the display driver is configured to control at least a portion of the displayed indicia, said display driver being electrically connected to the flexible display panel and configured to receive instructions from the controller; and the controller is operatively coupled to said value-input device, said input device, and said display driver, said controller comprising a processor and a memory operatively coupled to said processor, and configured to i) choose an initial indicia to display on the at least one flexible display panel; ii) instruct the display driver to display the chosen indicia; iii) detect a deposit of the medium of value; iv) detect a wager; v) determine game play indicia; vi) instruct the display driver to display the game play indicia; vii) cause said motor to spin said reel; viii) determine a game outcome; ix) cause said motor to stop said reel according to said determined outcome, and, as the reel is being stopped, instruct the display driver to change from displaying game play indicia to displaying indicia representative of the determined outcome; and x) determine a value associated with the determined outcome.

2. The gaming apparatus of claim 1 wherein said controller is configured to be programmed to display gaming instructions on the at least one flexible display panel.

3. The gaming apparatus of claim 1 wherein said controller is configured to be programmed to display a simulation of game play on the at least one flexible display panel.

4. The gaming apparatus of claim 1 wherein said controller is configured to be programmed to change the game play indicia on the gaming apparatus.

5. The gaming apparatus of claim 1, wherein the indicia are selected based upon an amount of value received at the gaming apparatus.

6. The gaming apparatus of claim 1, further comprising at least one additional reel.

7. The gaming apparatus of claim 1, wherein the reel further comprises a slip ring drum rotatable about said axis of said reel, wherein said slip ring drum includes a plurality of electrical conductors; and a plurality of electrically conductive brushes operatively coupled to said slip ring drum.

8. The gaming apparatus of claim 1, wherein the controller is configured to be programmed to change the indicia displayed on the at least one flexible display prior to initiating the wager-based game, during the play of the wager-based game or after the play of the wager-based game.

9. A gaming apparatus comprising:

a housing;

a value-input device configured to receive a medium of value;

an input device configured to receive a wager;

a display driver;

a controller; and a reel rotatable about an axis, the reel comprising;

a support mechanism having an outer circumference; and at least one flexible display panel capable of being shaped to mount to said outer circumference, said at least one flexible display panel mounted to said outer circumference, and comprising at least one of a liquid crystal display or light emitting diode display configured to display indicia;

wherein:

the display driver is configured to control at least a portion of the displayed indicia, said display driver being configured to receive instructions from the controller; and the controller is operatively coupled to said value-input device and said input device, said controller comprising a processor and a memory operatively coupled to said processor, and configured to i) choose an initial indicia to display on the at least one flexible display panel, ii) instruct the display driver to display the chosen indicia, iii) detect the medium of value received via the input device, iv) after detecting the medium of value received, determine game play indicia, v) instruct the display driver to display the game play indicia, vi) cause a motor to spin said reel; vii) determine a value associated with an outcome of a wager-based game played on the gaming apparatus, and viii) cause said motor to stop said reel according to the outcome, and, as the reel is being stopped, instruct the display driver to change from displaying game play indicia to displaying indicia representative of the outcome.

10. The gaming apparatus of claim 9 wherein said controller is configured to be programmed to change the game play indicia on the gaming apparatus.

11. The gaming apparatus of claim 9 wherein said controller is configured to be programmed to display gaming instructions or a simulation of game play on the at least one flexible display.

12. The gaming apparatus of claim 9, wherein the controller is further programmed to control a spin of the reel using the motor.

13. The gaming apparatus of claim 9, wherein the display driver is mounted to the reel such that the display driver rotates when the reel rotates.

14. The gaming apparatus of claim 9, wherein the indicia are selected based upon an amount of value received at the gaming apparatus.

15. The gaming apparatus of claim 9, further comprising at least one additional reel.

16. The gaming apparatus of claim 9, wherein the reel further comprises a slip ring drum rotatable about said axis of said reel, wherein said slip ring drum includes a plurality of electrical conductors; and a plurality of electrically conductive brushes operatively coupled to said slip ring drum.

17. The gaming apparatus of claim 9, wherein the controller is configured to be programmed to change the indicia displayed on the at least one flexible display prior to initiating the wager-based game, during the play of the wager-based game or after the play of the wager-based game.

18. A gaming apparatus comprising:

a controller;

a reel rotatable about an axis and having an outer circumference; and at least one flexible display panel capable of being shaped to mount to said outer circumference, said at least one flexible display panel mounted to said outer circumference, and comprising at least one of a liquid crystal display or light emitting diode display configured to display indicia;

wherein:

the controller is operatively coupled to said at least one flexible display panel, said controller comprising a processor and a memory operatively coupled to said processor and configured to i) choose an initial indicia to display on the at least one flexible display panel, ii) cause the at least one flexible display panel to display the chosen indicia, iii) determine game play indicia, iv) cause a motor to spin said reel; v) determine a value associated with an outcome of a wager-based game played on the gaming apparatus, and vi) cause said motor to stop said reel according to the outcome, and, as the reel is being stopped, instruct the display driver to change from displaying game play indicia to displaying indicia representative of the outcome.

19. The gaming apparatus of claim 18 wherein said controller is configured to be programmed to display gaming instructions or a simulation of game play on the at least one flexible display.

20. The gaming apparatus of claim 18, wherein the controller is further programmed to control a spin of the reel using the motor.

21. The gaming apparatus of claim 18, further comprising a display driver adapted to cause display of the indicia on the at least one flexible display responsive to instructions from the controller.

22. The gaming apparatus of claim 18, wherein the indicia are selected based upon an amount of value received at the gaming apparatus.

23. The gaming apparatus of claim 18, further comprising at least one additional reel.

24. The gaming apparatus of claim 18, wherein the reel further comprises a slip ring drum rotatable about said axis of said reel, wherein said slip ring drum includes a plurality of electrical conductors; and a plurality of electrically conductive brushes operatively coupled to said slip ring drum.

25. The gaming apparatus of claim 18, wherein the controller is configured to be programmed to change the indicia displayed on the at least one flexible display prior to initiating the wager-based game, during the play of the wager-based game or after the play of the wager-based game.

26. The gaming apparatus of claim 21, wherein the display driver is mounted to the reel such that it rotates when the reel rotates.

27. A gaming apparatus comprising:

a housing;

a value-input device configured to receive a medium of value;

an input device configured to receive a wager;

a display driver;

a controller; and a reel rotatable about an axis, the reel comprising;

a support mechanism having an outer circumference; and at least one display panel mounted on said outer circumference, said at least one display panel substantially conforming to a curvature of the outer circumference, said at least one display panel comprising at least one of a liquid crystal display or light emitting diode display configured to display indicia;

wherein:

the controller comprises a processor and a memory operatively coupled to said processor; and the display driver is configured to control at least a portion of the displayed indicia, the display driver being configured to receive instructions from the controller; and the controller is operatively coupled to said value-input device, said input device, and said display driver, configured to be programmed to i) choose an initial indicia to display on the at least one display panel, ii) instruct the display driver to display the chosen indicia, iii) detect the medium of value received via the input device, iv) after detecting the medium of value received, determine game play indicia, v) instruct the display driver to display the game play indicia, vi) cause a motor to spin said reel; vii) determine a value associated with an outcome of a wager-based game played on the gaming apparatus, and viii) cause said motor to stop said reel according to the outcome, and, as the reel is being stopped, instruct the display driver to change from displaying game play indicia to displaying indicia representative of the outcome.

28. The gaming apparatus of claim 27, wherein said display panel is flexible.

29. The gaming apparatus of claim 27 wherein said controller is configured to be programmed to change the game play indicia on the gaming apparatus.

30. The gaming apparatus of claim 27 wherein said controller is configured to be programmed to display gaming instructions or a simulation of game play on the display.

31. The gaming apparatus of claim 27, wherein the controller is further programmed to control a spin of the reel using the motor.

32. The gaming apparatus of claim 27, wherein the reel further comprises a slip ring drum rotatable about said axis of said reel, wherein said slip ring drum includes a plurality of electrical conductors; and a plurality of electrically conductive brushes operatively coupled to said slip ring drum.

33. The gaming apparatus of claim 27, wherein the display driver is mounted to the reel such that the display driver rotates when the reel rotates.

34. The gaming apparatus of claim 27, wherein the indicia is selected based upon an amount of value received at the gaming apparatus.

35. The gaming apparatus of claim 27, further comprising at least one additional reel.

* * * * *